Figure 1:
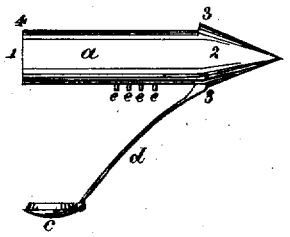

R. H. St. JOHN.

SEWING-MACHINE SHUTTLE.

No. 7,615. Reissued April 17, 1877.

WITNESSES

Chas J. Gooch

Le Blond Burdett

INVENTOR

Roswell H. St John.

By Knight Bros. Attorneys

N. PETERS, PHOTO-LITHOGRAPHER, WASHINGTON, D. C.

UNITED STATES PATENT OFFICE.

ROSWELL H. ST. JOHN, OF SPRINGFIELD, OHIO.

IMPROVEMENT IN SEWING-MACHINE SHUTTLES.

Specification forming part of Letters Patent No. 171,879, dated January 4, 1876; reissue No. 7,615, dated April 17, 1877; application filed February 9, 1877.

*To all whom it may concern:*

Be it known that I, ROSWELL H. ST. JOHN, of Springfield, in the county of Clarke and State of Ohio, have invented an Improved Sewing-Machine Shuttle, of which the following is a specification:

The subject-matter of this invention is the improved shuttle of peculiar construction referred to in Letters Patent No. 155,120, issued to me under date of September 15, 1874, for an improvement in sewing-machines, and relates to what are termed "reciprocating shuttles," and particularly to those shuttles which are cylindrical in general shape, the bobbin being introduced at the rear end or heel of the shuttle, and confined by a heel-piece.

My improvement consists, first, in the combination of a latch which is adapted to shut against the side of the shuttle-case, and a stud or projection applied in such manner as to cross the path of the thread and prevent it slipping between the shuttle-case and the latch.

My improvement consists, secondly, in a latch which is hinged permanently to the exterior at one end of the shuttle-case, and is adapted to move in a plane perpendicular to the surface to which it is applied.

The object of this improvement is to provide means for releasing the thread from the tension device, or confining it therein by a direct movement, without liability of tangling or disarranging it.

My improvement consists, thirdly, in the provision of one or more tension-pins on the upper side of the shuttle, in combination with a latch having perforations to permit it to receive the ends of the said pins, and also keep the thread in place.

The object of this improvement is to provide a more ready means for adjusting the tension, and is greatly valued by those who suffer from bad eyesight, and the blind, as it does not necessitate the use of the eyes. It also has an advantage over tensions formed by passing the thread through perforations, as on the sharp edges of the latter the thread is liable to be cut, especially in new shuttles. This would be impossible in reeving the thread around tension-pins.

My improvement consists, fourthly, in a latch having a beveled heel-piece hinged thereto, said heel-piece forming a door to the bobbin-receptacle.

The object of this improvement is to provide a heel-piece which can be guided into position, first, by the latch, and, secondly, by its bevel. It also closes the bobbin-receptacle completely, and prevents oil or other foreign matter from entering therein. It also provides a more ready means for opening the bobbin-receptacle.

My improvement consists, fifthly, in a slot cut from the rear end of the shuttle forward a sufficient distance to permit the free passage of the thread from the bobbin to or around a tension-pin, so that when the bobbin is placed in the shuttle-case and the thread drawn through the slot into proper position the closing of the latch completes the threading.

The object of this improvement is to facilitate the operation of threading, and save valuable time thereby.

Figure 2:
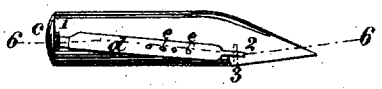
Figure 3:
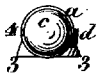
Figure 4:
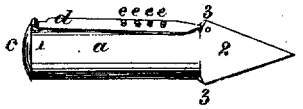
Figure 5:
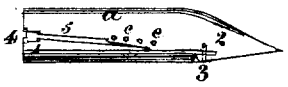
Figure 6:
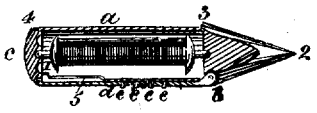

In the accompanying drawing, Figure 1 is a plan view of this shuttle as opened to receive a bobbin. Fig. 2 is a side elevation. Fig. 3 is a rear elevation, and Fig. 4 is a bottom view of the shuttle as closed. Fig. 5 is a side elevation of the shuttle with the latch and beveled heel-piece detached. Fig. 6 is a horizontal section on the line 6 6, Fig. 2.

The hollow body *a* of this shuttle is cylindrical, and of sufficient size to accommodate an approved bobbin, *b*, which latter may be of a common form with solid spindle. The rear end or heel 1 of the shuttle-body is open. Its point or toe 2 is sharpened, and is furnished at bottom with lateral projections 3, which aid in forming the point, prevent the shuttle from turning, and keep the right side of the shuttle to the needle, besides adding to the smooth working of the shuttle, and adapting it to run in an ordinary race, either straight or curved. A cup-bearing for one end of the bobbin-spindle is formed in the solid point 2 of the shuttle. A bearing for its other end is formed in the center of a beveled heel-piece, *c*, by which the heel 1 is closed and the bobbin secured. A latch, *d*, is hinged to the shuttle-case, at its front end, and to the outer end of this latch the heel-piece *e* is hinged, as most clearly illustrated in Fig. 1, so that the cap shall secure the latch, and the latter shall prevent the loss of the heel-piece, while permitting its removal from the shuttle, to facilitate introducing and removing the bobbin. The heel-piece is made to fit tightly enough to prevent its accidental displacement, and a notch, 4, is provided in the shuttle-body to admit the thumb-nail for opening the heel-piece. The latch is perforated, as represented, but not to receive the thread.

As a more convenient substitute for holes or notches as tension devices, one or more tension pins or studs, *e*, are applied to the upper side of the shuttle-body, and the said perforations in the latch receive the ends of these pins. The pin or stud of the series nearest the point prevents the thread from slipping back on the shuttle, and the hinge of the latch will keep the thread away from the point of the shuttle, thus preventing unthreading and displacement of the thread.

A longitudinal slot, 5, is formed in the face of the shuttle, extending from the heel to these tension-pins, and, preferably, beneath one or more of the latter, as represented in Fig. 5.

A new bobbin having been introduced, the retained outer end of the thread is quickly drawn into this slot and around one or more of the pins, for the required tension. The required tension is imparted to the thread by its friction against the pin or pins, or by the pressure of the latch, or both. The latch and heel-piece are then closed, and the shuttle is ready for use.

The hinges and other details of construction may be of the simplest character.

The advantages gained by this improved construction of shuttles will be apparent. The thread and tension can be got at in one and the same operation, thereby saving time in getting the machine ready for work, while other shuttles have to be threaded through holes or work-screws. The threading, as is well known, is a matter of great importance. This simple device meets the demand for a quickly-threaded shuttle.

The latch, being adapted to be raised perpendicularly from the surface of the shuttle-case, entirely frees the thread from one tension-pin at a time.

The pins or studs being located one in rear of the other, the thread can be fixed in different positions on the case.

Having thus described my invention, the following is what I claim as new and desire to secure by Letters Patent:

1. An external latch adapted to shut against the side of the shuttle-case, in combination with the shuttle-case and a stud or projection to prevent the thread which passes beneath the said latch from slipping back on the shuttle.

2. The combination, with a shuttle-case, of a plate or arm permanently hinged thereto, and guided in a plane perpendicular to the surface to which it is attached, and carrying a heel-piece to close the rear end of the case.

3. In a sewing-machine shuttle-case, one or more tension-pins, *e*, on the upper side of the shuttle, in combination with a latch, *d*, perforated to receive the ends of the said pins, substantially as set forth.

4. In a sewing-machine shuttle-case, the latch *d*, in combination with the beveled heel-piece *c*, hinged thereto, substantially as and for the purposes set forth.

5. In combination with a shuttle-case having a longitudinal slot, 5, one or more tension-pins, *e*, and latch *d*, as and for the purpose set forth.

ROSWELL H. ST. JOHN.

Witnesses:
A. WADDLE, JR.,
H. L. BRADLY, JR.